United States Patent

[11] 3,562,521

| [72] | Inventors | George Frederick Vanderschmidt<br>Jamica Plain;<br>James Scott Riley, Peabody, Mass. |
|---|---|---|
| [21] | Appl. No. | 701,741 |
| [22] | Filed | Jan. 30, 1968 |
| [45] | Patented | Feb. 9, 1971 |
| [73] | Assignee | Lion Precision Corporation<br>a corporation of Pennsylvania |

[54] INSTRUMENT FOR MEASUREMENT OF PARTIAL PRESSURE OF COMPONENTS IN A FLUID MIXTURE
7 Claims, 6 Drawing Figs.

[52] U.S. Cl. .................................................. 250/43.5,
250/44, 250/83.6, 73/23
[51] Int. Cl. ......................................... G01n 21/26,
G01n 23/12, H01j 37/00
[50] Field of Search ........................................ 250/43.5R,
43.5D, 44, 83.6Ft; 73/23; 324/23

[56] References Cited
UNITED STATES PATENTS
| 2,456,163 | 12/1948 | Watson ........................ | 73/23 |
| 3,009,061 | 11/1961 | Roehrig ....................... | 250/83.6X |
| 3,009,063 | 11/1961 | Roehrig ....................... | 250/44X |

*Primary Examiner*—Ralph G. Nilson
*Assistant Examiner*—D. L. Willis
*Attorney*—Kenway, Jenney and Hildreth

ABSTRACT: A system providing an output signal linearly related to the amount of one selected component present in a mixture of fluids having at least two components. The system includes at least two detectors, one producing an output signal which may be expressed as the sum of two terms where the first term varies in linear proportion to variations in the partial pressure of the selected component and the second term varies in proportion to the variations in the total pressure of the fluid independent of its composition. The second detector produces an output which varies in proportion to variations in the total pressure of the mixture, independent of its composition. The two signals are then combined to produce an output signal which varies linearly with the amount of the selected component, independent of variations in the total pressure of the mixture.

PATENTED FEB 9 1971

INVENTORS
GEORGE FREDERICK VANDERSCHMIDT
JAMES SCOTT RILEY
BY
Kenway, Jenney & Hildreth
ATTORNEYS

1

INSTRUMENT FOR MEASUREMENT OF PARTIAL PRESSURE OF COMPONENTS IN A FLUID MIXTURE

FIELD OF THE INVENTION

This invention relates in general to measurement of partial pressures in a mixture of gases or other fluids and more particularly to a system for accurate measurement of partial pressures in a two-gas medium in which the total pressure is also varying.

There are a number of situations in which it is required to accurately control the partial pressure of a component in a fluid mixture under conditions where the total pressure of the mixture is also varying. Such requirements are imposed, for example, in the control of the gaseous environment supplied to a deep-sea diver or to the cabin of a space vehicle. The requirements of the environment in both situations are substantially the same and involve supplying oxygen as one component of a two-gas system. The second gas is generally nitrogen, helium or some combination of inert gases. Both the partial pressure of the oxygen and the total pressure of the mixture must be carefully controlled in order to avoid physiological damage and to minimize the danger of combustion. In these applications, the total pressure of the mixture varies due to cabin leaks and the like, while the partial pressure of oxygen varies as it is consumed by the crew. In order, therefore, to maintain both the partial pressure of oxygen and the total pressure at the proper value, the supply of oxygen and the second gas must be separately controlled. Thus precise measurement of partial pressures is required.

One type of detector which has been utilized for measuring oxygen, is a chemical sensor of the polarographic type. In this sensor, the gas mixture is exposed through a semipermeable membrane to an electrolytic cell whose conductivity will depend upon the amount of dissolved oxygen in the solution. Such a measurement system is not suitable for the applications mentioned above, particularly since it cannot readily tolerate either very high pressures, as encountered in deep-sea diving, or possible evacuation of the cabin as may be encountered in space vehicles. Other oxygen sensors have been designed to respond to the high paramagnetism of oxygen. However, this effect is very small in gaseous oxygen and measurement instruments of this type therefore become extremely fragile and costly.

SUMMARY OF THE INVENTION

Broadly speaking, the measurement system of this invention employs a detector of the radiological type to produce an output signal which responds in a linear fashion to variations in the partial pressure of one component. The output from such a detector, however, also varies, with the total pressure of the mixture. The system includes a second detector which produces an output signal indicative of the total pressure of the mixture, irrespective of its compositions. These two output signals are then combined to produce an output signal from the system directly indicative of the partial pressure of one component independent of the total pressure of the mixture.

The detector responding to the partial pressures of components is an ionization detector of the type described in U.S. Pat. No. 3,255,348, which is generally responsive to the ionization cross section of the gas to which it is exposed. The total pressure sensor may be any conventional sensor operating over the appropriate range with the appropriate sensitivity, provided, however, that its output must not be dependent upon the composition of the fluid mixture.

DESCRIPTION OF A PREFERRED EMBODIMENT

Figure 1:
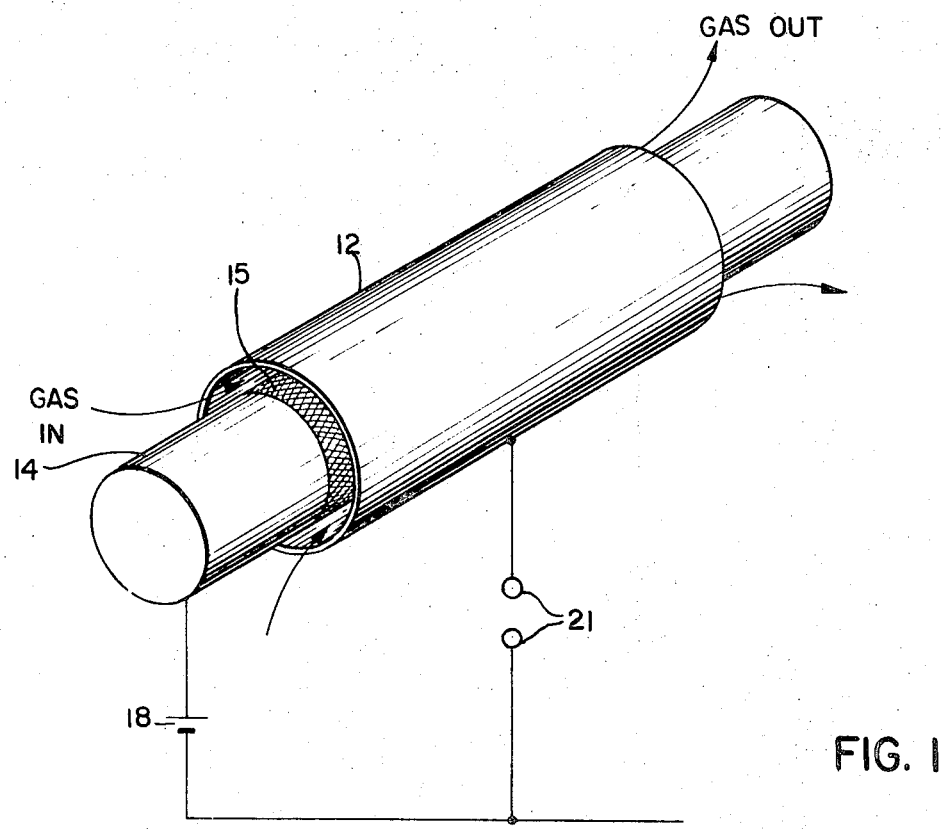
FIG. 1 is an illustration in perspective view of a radiological gas detector suitable for use in the practice of this invention.

With reference now to FIG. 1, there is illustrated a radiological ionization detector which provides an output signal directly related to the ionization cross section of gas supplied to it. This detector is described in detail in U.S. Pat. No. 3,255,348. Generally the detector includes an outer electrically conductive cylinder 12 and an inner, concentrically mounted, electrically conductive cylinder 14. The inner cylinder 14 is separated from the outer cylinder 12 by a small gap, typically .125 inches for an inner cylinder having a diameter of 1 inch. The radioactive source 15 in the form of a thin conductive foil is attached to the outer surface of the inner cylinder 14 and is substantially coextensive with the overlap between outer cylinder 12 and the inner cylinder 14. The radioactivity selected for this source is a matter of design choice and generally will consist of an alpha or beta emitter. One suitable isotope is an americium-241, which provides a suitable source for use in the detector to measure the partial pressure of oxygen in oxygen-helium or oxygen-nitrogen mixtures. A suitable voltage source 18 is connected between the inner and outer cylinders and the ionization current is measured across a pair of terminals 21. The voltage source 18 would typically be a source providing a voltage of approximately 40 volts at extremely low current drain. Provisions are made for flowing the gas mixture to be analyzed into the gap between the outer cylinder 12 and the inner cylinder 14. In those instances where small amounts of a specific contaminant, such as $CO_2$ or water vapor, are expected, the gas flow system may include selective filters (not shown) to eliminate them from this detector.

Figure 2:
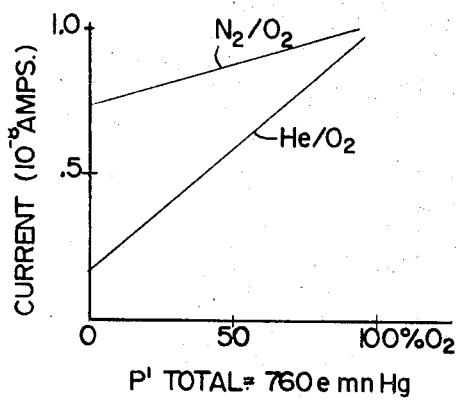
FIG. 2 is a graphical illustration of the response characteristics of the detector of FIG. 1 for various gas mixtures.

In FIG. 2, the output signal from the detector of FIG. 1 is illustrated for mixtures of oxygen and nitrogen and mixtures of oxygen and helium. The current from the detector is plotted along the vertical coordinate and the percentage of oxygen (by volume) in the mixtures is plotted along the horizontal coordinate. In FIG. 2, the total pressure of the mixture is 760 equivalent millimeters of mercury (e mm. Hg). The The total pressure is expressed in terms of equivalent pressure since, physiologically, the number of grams per cubic centimeter of oxygen available (the partial density) is more significant than the partial pressure. The relationship between the partial density and partial pressure may be expressed as, $$P' = 530P/T$$

where $T$ is the absolute temperature in ° R. Thus at 70° F. the partial density and partial pressure are equal. curves Referring to FIG. 2, it can be seen that the response of the detector, for a varying oxygen percentage in a mixture of helium and oxygen varies linearly. Similarly, for a mixture of nitrogen and oxygen the output of the detector varies linearly with the variations in oxygen percentage. The response curves for both mixtures have a current value at zero oxygen percentage, the value for the oxygen-helium mixture being less than that for the oxygen-nitrogen mixtures.

Figure 3:
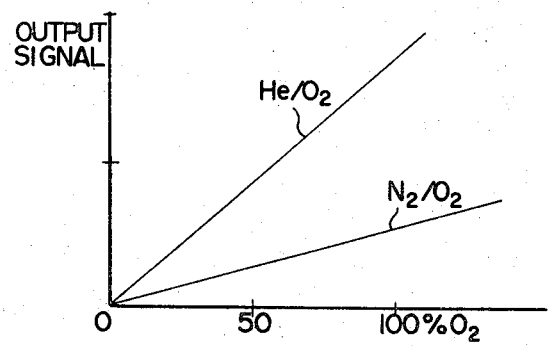
FIG. 3 is an illustration of the response characteristics of FIG. 2 after zero correction.

In FIG. 3, a zero offset signal of one value has been subtracted from the curve characteristic of the helium-oxygen response and a zero offset value of a different value has been subtracted from the characteristic for the nitrogen-oxygen mixture. For either mixture, at a constant total pressure, then the detector produces a linear response characteristic to variations in partial pressure of oxygen.

Figure 4:
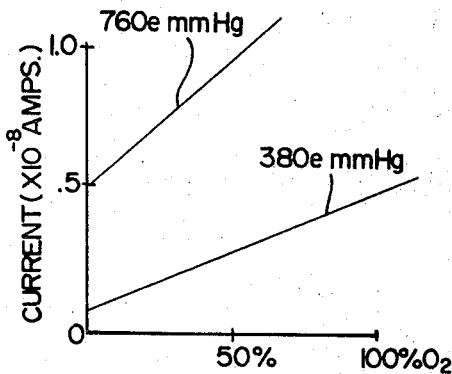
FIG. 4 is a graphical illustration of the response characteristics of the detector of FIG. 1 for various total pressures of a helium-oxygen mixture.

In FIG. 4, the detector characteristics are shown for mixtures of helium and oxygen at two different total equivalent pressures. Again in this instance, it will be noted that the variation of output signal with percentage of oxygen is linear for both total pressures with the amount of zero offset and the slope of the characteristics different for each total pressure.

Figure 5:
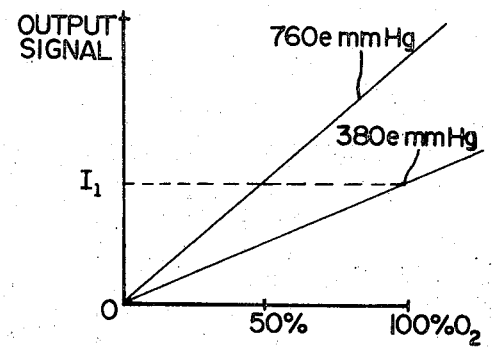
FIG. 5 is an illustration of the response characteristic of FIG. 4 after zero correction.

In FIG. 5, the response characteristics of FIG. 4 are shown after they have been corrected by subtracting a different fixed signal for the 760 e mm. Hg pressure than was subtracted for the 380 e mm. Hg curve. If the output of the detector illustrated in FIG. 1 is corrected by subtracting an amount related to the total equivalent pressure of the mixture, then this output will vary linearly with the amount of oxygen present. An output signal of value $I_1$, for example, will indicate the equivalent partial pressure of oxygen present irrespective of the total pressure of the mixture. Although in the graph of FIG. 4, this signal value represents a different percentage of oxygen for the two curves, the amount of oxygen present will be identical, since a 50 percent oxygen mixture at 760 e mm. Hg contains the same amount of oxygen as a 100 percent mixture at 380 e mm. Hg.

The output characteristics of the detector illustrated in FIG. 1 may be expressed mathematically as follows.

$$I_S = I_R P'_O K_O + I_R P'_N K_N$$

where, $I_S$ is the saturation current from the ionization chamber of the detector of FIG. 1, $I_R$ is the current of high energy particles from the radioactive source, $P'_O$ and $P'_N$ are the equivalent partial pressures of oxygen and the the second gas respectively, and $K_O$ and $K_N$ are the characteristic cross sections for oxygen and for the second gas.

The total equivalent pressure for the fluid mixtures may be expressed as $$P' = P'_O + P'_N.$$

The current from the chamber may then be expressed in terms of the equivalent partial pressure of oxygen and the total equivalent pressure of the mixture as $$I_S = I_R (K_O - K_N) P'_O + I_R K_N P'.$$

In this equation, it can be seen that the output current characteristic from the detector includes two terms, the first term being linearly proportional to the equivalent partial pressure of oxygen and the second term being proportional to the equivalent total pressure of the gas mixture.

A system which includes both the detector illustrated in FIG. 1, and a separate pressure transducer providing an output related only to the total pressure of the mixture, independent of the composition, may then be arranged to produce an output signal linearly related to the partial pressure of oxygen over a wide range of total pressures of the mixture. Such a system is illustrated in FIG. 6.

Figure 6:
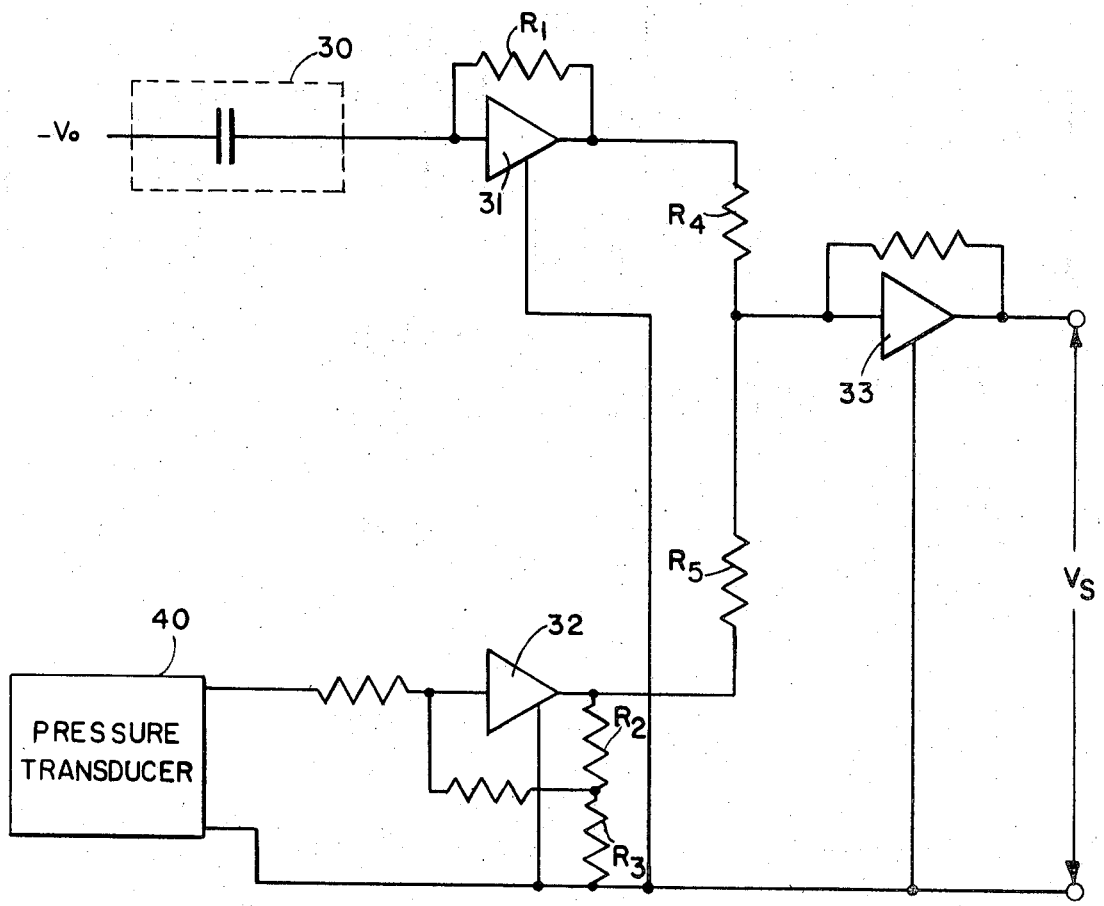
FIG. 6 is an illustration in schematic form of a measurement system constructed in accordance with the principles of the this invention.

Turning to FIG. 6, the detector 30 is connected to a negative voltage supply $-V$ at one electrode, with the other electrode connected to the input of amplifier 31. This amplifier 31 converts the current $I_S$ from the detector into a voltage signal $I_S R_1$. The pressure transducer 40, which may be any conventional pressure transducer, has its output coupled to the input of operational amplifier 32, which serves to isolate the transducer from the remainder of the circuit. The amplifier 32 and its associated resistors are adjusted so that output from this amplifier $V_p$ may be expressed as $$V_P = I_R K_N P'$$

The operational amplifier 33 is connected to the outputs from amplifiers 31 and 32 through resistors $R_4$ and $R_5$ such that the output from amplifier 33 is the difference between the signals from the detector amplifier 31 and the pressure transducer amplifier 32.

The output signal $V_S$ from the circuit is then $$V_S = I_R R_1 (K_O - K_N) P'_O$$

Thus the output from the system illustrated in FIG. 4 is a voltage signal which varies in linear proportion to the equivalent partial pressure of oxygen independent of the total pressure of the mixture. The output from this circuitry will produce, for each total pressure of the mixture, a response as is shown in FIG. 5. While the total pressure indicator 40, may be any suitable detector, one approach is to use an ionization detector substantially identical to that employed for detector 30, arranged, however, to be exposed only to the inert gas. For example, a very small stream of the inert gas can be flowed into this second detector and thence into the environment being tested. While the ambient pressure of the environment will control the pressure in this second detector, the gas within it will be only the inert gas. This detector produces an output which is directly related to the equivalent total pressure.

As earlier mentioned, the critical value from the physiological point of view is the equivalent partial pressure or partial density rather than the partial pressure. The output from the detector illustrated in FIG. 1 and included in FIG. 6 is linearly proportional to the partial density, however, the output from other forms of the total pressure transducer 40 is generally directly related to pressure, rather than density. Thus the uncorrected signal from this transducer 40 produces an accurate result only at a temperature at or very close to 70° F. The density, expressed as an equivalent pressure $P'$ is related to the total pressure according to the following relationship, $$P' = 530P/T$$

If the resistor network $R_2$ and $R_3$ at the output of amplifier 32 is formed with temperature sensitive resistors, then the gain of the circuit may be made to depend upon the absolute temperature $T$. Under these circumstances, the circuit illustrated in FIG. 4 will operate over a wide range of temperatures as well as pressures.

In some instances, however, it may be desirable that the device indicate partial pressure rather than equivalent partial pressure. In this case, the temperature compensation would be applied to the output of the detector which is sensing the equivalent partial pressure of the specific fluid component, so that the output from the system would be in partial pressure directly.

While the invention has been described in terms of a two-gas system including oxygen and a second gas, it is apparent that the invention may be used in any system including a mixture of two fluids.

Having disclosed the invention modifications and improvements will occur to those skilled in the art and the invention described should be construed as limited only by the spirit and scope of the appended claims.

We claim:

1 Apparatus for measuring the partial pressure of a first component in a mixture of fluid components over a range of total pressure of the mixture without physical separation of the components comprising:
   a first detector;
   a second detector;
   means for exposing said first and second detectors to said fluid mixture, said first detector providing an output electrical signal which may be expressed as the sum of two terms, said first term varying in linear proportion to variations in the partial pressure of said first fluid component at a given total pressure and said second term varying in proportion to variations in the total pressure of said fluid mixture;
   said second detector providing an output electrical signal which varies in proportion to variations in the total pressure of said fluid mixture, independent of the composition of said mixture; and
   circuit means for combining the output signals from said first and second detectors to produce a signal which varies in linear proportion to variations in the partial pressure of said first component independently of variations in the total pressure of said mixture.

2. Apparatus in accordance with claim 1 wherein said first detector is a narrow gap ionization chamber having a radioactive source included therein, said detector providing an output current which varies in proportion to the ionization cross section of the fluid passed within said gap, and wherein said means for exposing said first and second detectors to said fluid mixture includes means for passing said fluid mixture through said gap.

3. Apparatus in accordance with claim 2 wherein said circuit means for combining said signals comprises a subtraction circuit which subtracts the output signal from said second detector from the output signal from said first detector.

4. Apparatus in accordance with claim 2 wherein said first component is selected from the inert gases.

5. Apparatus in accordance with claim 2, wherein said second detector provides an output signal which is independent of temperature, and further including temperature sensitive means coupled to said second detector for modifying the output signal from said second detector in accordance with variations in temperature such that the signal from said second detector varies in linear proportion to variations in the equivalent pressure of said total gas mixture.

6. Apparatus in accordance with claim 2 wherein said second detector provides an output signal which is independent of temperature and further including temperature sensitive means coupled to said first detector for modifying the output signal from said first detector in accordance with variations in temperature such that said modified signal varies in proportion to partial pressure only over a wide range of temperature.

7. Apparatus in accordance with claim 2 wherein said second detector is substantially identical to said first detector, said second detector being exposed at a pressure equal to the total pressure of said mixture only to those components of said fluid which are not said first component.

PO-1050
(5/69)

UNITED STATES PATENT OFFICE
CERTIFICATE OF CORRECTION

Patent No. 3,562,521          Dated February 9, 1971

Inventor(s) George Frederick Vanderschmidt & James Scott Riley

It is certified that error appears in the above-identified patent and that said Letters Patent are hereby corrected as shown below:

Column 2, line 58 reads partial density and partial pressure are equal. curves should read partial density and partial pressure are equal.

Column 5, Claim 4 reads

Apparatus in accordance with Claim 2 wherein said first component is selected from the inert gases.

should read

Apparatus in accordance with Claim 2 wherein said first component is oxygen and said second component is selected from the inert gases.

Signed and sealed this 6th day of July 1971.

(SEAL)
Attest:

EDWARD M. FLETCHER, JR.
Attesting Officer

WILLIAM E. SCHUYLER, JR.
Commissioner of Patents

UNITED STATES PATENT OFFICE
CERTIFICATE OF CORRECTION

Patent No. 3,562,521     Dated February 9, 1971

Inventor(s) George Frederick Vanderschmidt & James Scott Riley

It is certified that error appears in the above-identified patent and that said Letters Patent are hereby corrected as shown below:

The first page reads:

Assignee  Lion Precision Corporation
          a corporation of Pennsylvania should read:

Assignee  Lion Precision Corporation
          a corporation of Massachusetts

Signed and sealed this 9th day of November 1971.

(SEAL)
Attest:

EDWARD M. FLETCHER, JR.     ROBERT GOTTSCHALK
Attesting Officer           Acting Commissioner of Patents